Nov. 17, 1931.  J. E. CHRISTEN  1,832,184
BUMPER
Filed Feb. 25, 1931
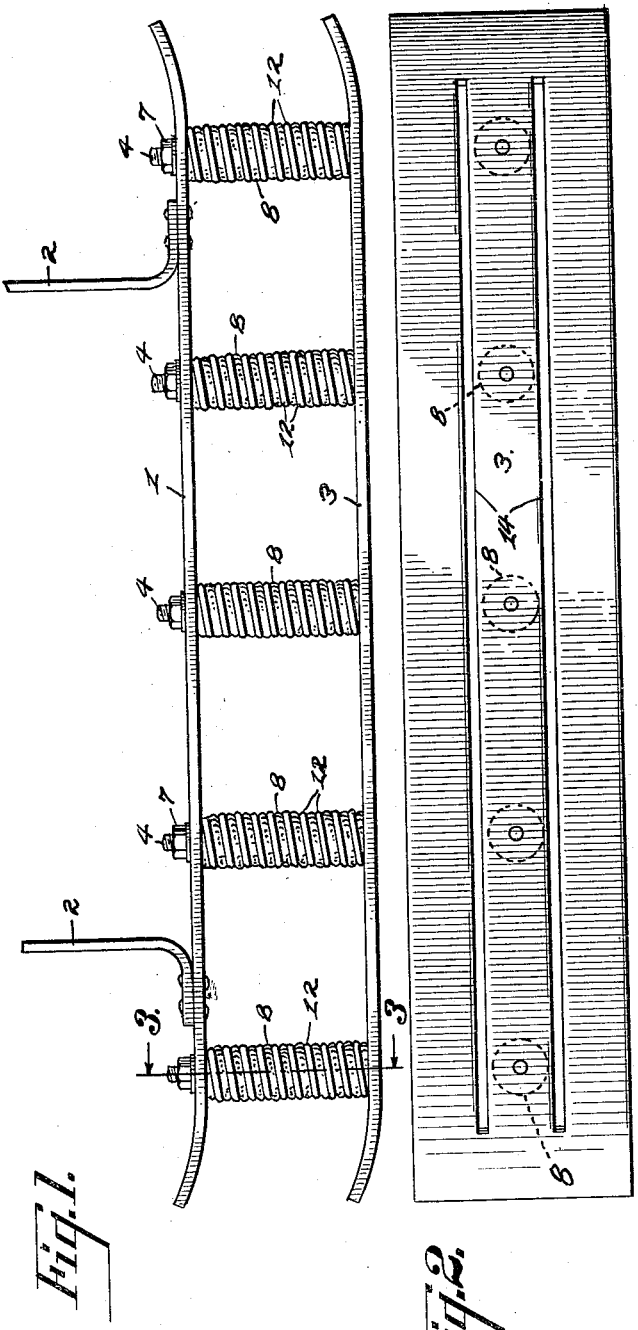
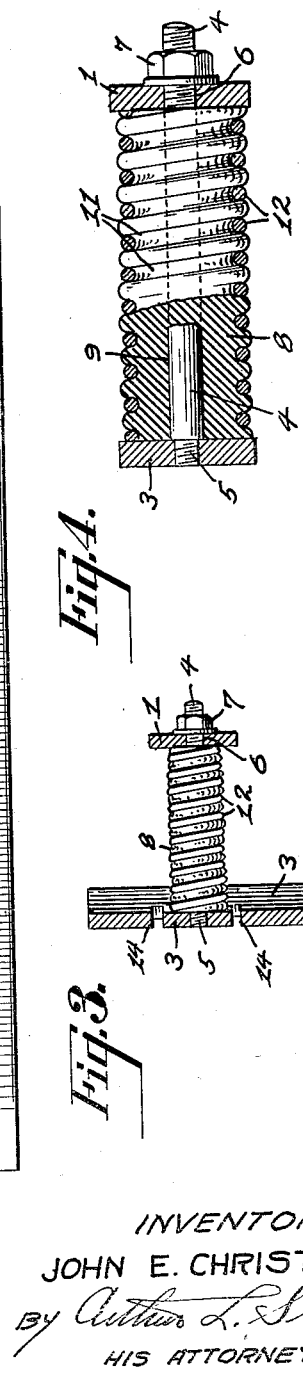
INVENTOR.
JOHN E. CHRISTEN.
BY Arthur L. Slee.
HIS ATTORNEY.

Patented Nov. 17, 1931

1,832,184

UNITED STATES PATENT OFFICE

JOHN EBERHARD CHRISTEN, OF SAN RAFAEL, CALIFORNIA

BUMPER

Application filed February 25, 1931. Serial No. 518,108.

My invention relates to improvements in bumpers for automobiles and the like wherein a fixed bar and a movable bar normally are held in spaced parallel relation by resilient means interposed between the bars, said means being yieldable under shock or pressure to resist displacement of the movable bar relative to the fixed bar.

My present invention is directed to improvements upon my former invention, Patent Number 1,696,429, issued to me upon December 25, 1928, and consists in an improved structure and arrangement wherein the outer movable bar is of rigid construction and provided with means whereby the movable bar is effectually secured in assembled relation and guided in its movement relative to the fixed bar.

The primary object of the present invention is to provide an improved bumper for automobiles and the like.

Another object is to provide an improved bumper adapted to effectually absorb shock imposed thereon and to reduce injury to the automobile and any object with which the bumper may collide.

A further object is to provide an improved bumper of rugged construction which will effectually absorb and distribute shock.

Another object is to provide an improved structure of the character described in which the several parts are effectually secured and held in operative assembled relation.

A still further object is to provide an improved device of simple, rugged, and efficient construction which is neat and attractive in appearance and which is positive and efficient in operation.

I accomplish these and other objects by means of the improved device disclosed in the drawings forming a part of the present application wherein like characters of reference are used to designate similar parts throughout the specification and drawings, and in which:—

Fig. 1 is a plan view of my improved bumper;

Fig. 2 is a front elevation of the bumper;

Fig. 3 is a transverse section taken upon the line 3—3 of Fig. 1 in the direction indicated, the cushion member being shown in elevation; and Fig. 4 is a broken sectional detail of the cushion member.

Referring to the drawings, the numeral 1 is used to designate a rigid bar arranged to be mounted in fixed position upon an automobile or the like, not shown, by means of mounting brackets 2 riveted or otherwise secured to the bar 1.

A movable bumper bar 3 is mounted in connection with the fixed bar 1. The bar 3 is rigid and is connected to the fixed bar 1 by means of a plurality of bolts or other suitable connecting members 4. The members 4 are threaded, as at 5, or otherwise rigidly secured to one of the rigid bars, preferably the outer movable bar 3, and extend through apertures 6 in the other bar. Nuts 7, or other suitable retaining means, are mounted upon the ends of the members 4 to limit the outward movement of the movable bar 3 relative to the fixed bar 1.

The movable bar 3 is normally held in spaced relation to the fixed bar 1 by means of resilient blocks 8, preferably made from rubber, or other suitable resilient material, mounted upon the connecting members 4 between the fixed and movable bars. The blocks 8 are preferably cylindrical in shape and are of a length adapted to obtain the desired spacing between the bars 1 and 3. The blocks 8 are provided with an opening 9 extending axially therethrough to receive the connecting members 4 whereby the blocks are effectually held in operative position between the bars.

The blocks 8 are preferably formed with a spiral groove 11 upon the outer cylindrical surface. Spiral springs 12 are preferably seated in the groove 11, the springs 12 being of a length substantially equal to the length of the blocks 8. The springs are preferably slightly compressed between the bars 1 and 3 when in normal position to assist the blocks 8 in holding the bars in the normal spaced relation, and to combine with said blocks to produce a resilient cushion adapted to yieldably resist displacement of the movable member 3 relative to the fixed bar 1.

The movable member 3 is preferably formed from a single metal plate having longitudinally disposed slots 14 dividing the plate into a plurality of bumper strips each rigidly joined to the other strips in a single integral structure by the unsevered portions of the plate at the ends of the plate. The connecting members 4 are connected to the central strip, the upper and lower strips affording increased width and an attractive appearance without unduly increasing the weight of the bumper. The integral structure affords relative lightness of construction, and avoids the expense of assembling a plurality of separate bars to obtain the same width of bumper.

In operation, the bumper, constructed and assembled as above described, is mounted upon an automobile or other object subject to collision or impact with other heavy or rigid bodies. In normal conditions, the movable member 3 is held outwardly to its extreme limit of movement by the blocks 8 and springs 12. In event of a collision, or when the bumper is subjected to impact with some external object, the outer movable bumper bar 3 is forced inwardly against the yielding resistance of the blocks 8 and springs 12. The resistance offered by the blocks 8 and springs 12 increases in proportion to the amount of displacement of the movable bar 3, the displacing force being distributed substantially equally along the entire length of the bumper. This yielding resistance to displacement operates to absorb the shock of impact, so that the moving body is brought to a stop gradually, and retards the motive force, in ordinary shocks, sufficiently to prevent serious damage. The size and strength of the blocks 8 and springs 11 are designed to meet the requirements of any particular service, and may be varied through a relatively large range by substituting springs 12 of various characteristics, or by omitting the springs entirely where the rubber blocks 8 afford sufficient resistance to meet ordinary requirements.

While I have illustrated and described what I regard as the preferred construction of my improved bumper, various specific details of construction and arrangement may be made without departing from the spirit of my invention, and I desire to avail myself of any such modification which may fall within the scope of the appended claims.

Having thus described my invention, what I claim as new and desire to secure by Letters Patent is:

1. A bumper comprising a pair of rigid bumper bars; mounting means upon one of said bars to mount the same upon a vehicle; connecting means carried by one of the bars and slidably engaging the other bar to secure the bars in assembled relation; and resilient means mounted upon the connecting means between the bars and normally holding said bars in spaced relation, said means comprising a resilient block having a spiral groove upon its outer surface, and a spiral spring seated within the groove, said block and spring being yieldable to absorb shock or pressure imposed upon the bumper.

2. A bumper comprising a fixed rigid bar provided with means to mount the same upon a vehicle; a rigid movable bar; bolts secured at one end to one of the bars and extending through apertures in the other bar, said bolts being slidably movable through said apertures to permit movement of the movable bar relative to the fixed bar, and being provided with means to limit the movement of said movable bar away from the fixed bar; and resilient means mounted upon the bolts between the bars to normally hold said bars in spaced parallel relation, said means comprising a resilient block having a spiral groove upon its outer surface, and a spiral spring seated in said groove and combining with said block to yieldably resist displacement of the movable bar when subjected to shock or pressure.

3. In a bumper, the combination with a fixed bar and a rigid movable bar, of resilient cushion means interposed between the bars and comprising a rubber block having a spiral groove on its outer surface; and a spiral spring seated within the groove and combining with said block to yieldably resist displacement of the movable bar.

In witness whereof, I hereunto set my signature.

JOHN E. CHRISTEN.